United States Patent [19]

Carden et al.

[11] Patent Number: 4,887,260
[45] Date of Patent: Dec. 12, 1989

[54] X.25 WIDE AREA NETWORK CHANNEL STATUS DISPLAY

[75] Inventors: Matthew J. Carden; Kim Lantz, both of Colorado Springs; Theresa L. Reh, Monument; Anne Trytten, Colorado Springs, all of Colo.; Yves Lubino, Albertville, France

[73] Assignee: Hewlett-Packard Company, Palo Alto, Calif.

[21] Appl. No.: 14,966

[22] Filed: Feb. 17, 1987

[51] Int. Cl.[4] .............................................. H04Q 11/04
[52] U.S. Cl. ...................................... 370/60; 370/94.1; 340/715; 340/525; 340/825.17
[58] Field of Search ............................ 370/60, 94, 13; 340/715, 286 M, 525, 825.06, 825.17; 364/521

[56] References Cited

U.S. PATENT DOCUMENTS

| | | | |
|---|---|---|---|
| 4,035,786 | 7/1977 | Yamauchi et al. | 340/220 |
| 4,493,044 | 1/1985 | Gerd H et al. | 364/579 |
| 4,611,320 | 9/1986 | Southard | 370/13 |
| 4,611,322 | 9/1986 | Larson et al. | 370/60 |
| 4,775,973 | 10/1988 | Tomberlin | 370/60 |

OTHER PUBLICATIONS

IEEE Communications Magazine, vol. 24, No. 1, Jan. 1986, pp. 16–27, IEEE, New York, US; M. H. Sherif et al.: "X.25 Conformance Testing—A Tutorial", p. 18, right-hand column; p. 24.
Nachrichten Elektronik, vol. 35, No. 12, 1981, pp. 467–471, Heidelberg, DE; G. Kafka: "X.25 Protokolltester", pp. 470–471.
Nachrichtentechnische Zeitschrift, vol. 34, No. 8, Aug. 1981, pp. 514–423, Berlin, DE; H. Gommlich: "Messtechnik an der Datenschnittstelle": p. 521, middle column, last paragraph, right-hand column.

Primary Examiner—Joseph A. Orsino
Assistant Examiner—Frank M. Scutch, III
Attorney, Agent, or Firm—Christopher J. Byrne

[57] ABSTRACT

Provided is a channel status display for an X.25 wide area network (WAN) DTE-DCE interface. The invention, designed for use with a protocol analyzer, monitors X.25 level-2 frame traffic on the DTE-DCE link and produces a dynamic channel-activity-data-structure based upon the level-2 frames. An important class of level-2 frames are so-called I-frames. I-frames contain a 12-bit LCI (Logic Channel Identifier) field. The LCI number identifies up to 4095 channels over which network calls may be transmitted and received at the DTE-DCE interface. The LCI field of an I-frame is used to index an array of pointers. The pointers point to list members in a linked list of call-records. A call-record is a complete listing of call information for a given channel. The array of pointers and the linked list of call-records together make up the channel-activity-data-structure. The data-structure is updated with each new I-frame. The data-structure is continually mapped onto the display screen of the protocol analyzer so as to produce a Channel-Activity-Display and/or a Call-Record-Display. The Channel-Activity-Display is a matrix display showing the status of 256 DTE-DCE interface channels at once, indexed by LCI number. The viewer may page through all 4095 possible channels, viewing 256 channels at once. The Call-Record-Display is a display of the call-record for a viewer-selected channel.

4 Claims, 10 Drawing Sheets

```
START TIME: 01/20 17:17                CHANNEL ACTIVITY              01/20
DURATION:   0 HRS 01 MIN               LCI RANGE 1-255               17:18

LCGN  0       .  .  .  .  .  .  .  .  .  .  .  .  .  .  .  .  .  .  .  .
      0    *  .  .  .  .  .  .  .  .  .  .  .  .  .  .  .  .  .  .  .  .
     20    ▨  .  .  .  .  .  .  .  .  .  .  .  .  .  .  .  .  .  .  .  .   STATUS KEY:
     40    *  .  .  .  .  .  .  .  .  .  .  .  .  .  .  .  .  .  .  .  .     .  IDLE
     60    *  .  .  .  .  .  .  .  .  .  .  .  .  .  .  .  .  .  .  .  .     ^  CALL BEING PLACED
     80    *  ^  .  .  .  .  .  .  .  .  .  .  .  .  .  .  .  .  .  .  .     *  DATA TRANSFER
    100    .  .  .  .  .  .  .  .  .  .  .  .  .  .  .  .  .  .  .  .  .     v  CALL BEING CLEARED
    120    .  .  .  .  .  .  .  .  .  .  .  .  .  .  .  .  .  .  .  .  .
    140    .  .  v  .  .  .  .  .  .  .  .  .  .  .  .  .  .  .  .  .  .
    160    .  .  .  .  .  .  .  .  .  .  .  .  .  .  .  .  .  .  .  .  .
    180    *  *  .  .  .  .  .  .  .  .  .  .  .  .  .  .  .  .  .  .  .   LINK STATUS  UP
    200    .  .  .  .  .  .  .  .  .  .  .  .  .  .  .  .  .  .  .  .  .
    220    .  .  .  .  .  .  .  .  .  .  .  .  .  .  .  .  .  .  .  .  .         20
    240    .  .  .  .  .  .  .  .  .  .  .  .  .  .  .  .  .  .  .  .  .

USE SOFTKEYS TO MAKE CHOICES
```

FIG 5A

| |
|---|
| STATE OF CHANNEL |
| CHANNEL NUMBER (LCI) |
| NUMBER OF CONTROL PACKETS |
| NUMBER OF USER-DATA PACKETS |
| CALLING ADDRESS (DTE) |
| CALLED ADDRESS (DTE) |
| TIME CALL WAS INITIATED |
| WHO INITIATED CALL (DTE OR DCE) |
| WHETHER CALL WAS SUCCESSFUL |
| WHAT KIND OF PACKET ENDED CALL |
| WHO ENDED CALL |
| POINTER TO NEXT ACTIVE CALL |
| POINTER TO PREVIOUS ACTIVE CALL |

FIG 8

X.25 WIDE AREA NETWORK CHANNEL STATUS DISPLAY

BACKGROUND OF THE INVENTION

A Wide Area Network (WAN) is a data communications network that interconnects data processing equipment at separate locations which are geographically remote from each other, such as locations in different cities, states and countries. A wellknown and widely adopted WAN standard is CCITT (International Telegraph and Telephone Consultative Committee) Recommendation X.25. Recommendation X.25 is an international standard protocol for a WAN packet-switched network (PSN). Packet-switching involves splitting data into relatively small pieces, known as data packets, and adding network information, such as the source and destination address, to each packet. The X.25 protocol defines the organization of packets transmitted over the network.

To a user of an X.25 network, the network quite properly may be thought of as a central cloud surrounded by locations outside the cloud at which data terminal equipment (DTE) resides. Users of the DTEs at various locations communicate with each other via packets which are transmitted through the cloud. Inside the cloud are switching nodes and data communication links. A switching node is a data communication processor which routes data packets through network data communication links. Some data communication links, such as dedicated circuits and telephone lines, are used for connections between a user's equipment and a switching node. Other links, such as dedicated circuits, satellite channels and digital lines, are used to connect switching nodes. A separate network processor known as the network control center (NCC) performs network management, such as access control, failure tracking, billing, and so forth.

Operation of the cloud is completely transparent to users at DTEs. In fact, communication between two DTEs may be thought of as a single virtual circuit between the DTEs, despite the fact that individual packets transmitted over a single virtual circuit may follow different actual paths through the cloud. For each DTE outside the cloud, there is Data Circuit-terminating Equipment (DCE) inside the cloud. The DCE is the DTE's port into the network. A packet sent from a first DTE to a second DTE will enter the cloud at the first DTE-DCE interface. From the first DCE, the message is routed through the cloud to the second DCE. Following delivery at the second DCE, the packet finally exits the cloud at the second DTE-DCE interface. As far as the communicating DTEs are concerned, however, there is a single virtual circuit between them for reception and transmission of packets. Such DTE-DTE virtual circuits are possible, that is, the operation of the cloud is transparent to DTEs, because of a standard DTE-DCE interface. The X.25 WAN protocol defines the DTE-DCE interface standard.

The X.25 protocol divides DTE-DCE communication into three levels. X.25 at level-1 defines the mechanical, electrical, functional and procedural requirements for activating, maintaining and deactivating the physical DTE-DCE link. Level-1 communication consists of a synchronous bit stream and the fundamental unit of communication transfer is the BIT. Level-2 defines the procedure to access the DTE-DCE link and to allow error-free flow information between a DTE and its DCE. The fundamental unit of communication transfer at level-2 is the FRAME. A FRAME consists of a contiguous sequence of BITs. Level-3 defines the format for embedding both control information and user data in a single packet and the procedures for establishing, maintaining and clearing virtual circuits between DTEs. The fundamental unit of communication transfer at level-3 is the PACKET. A PACKET is a contiguous sequence of BITs embedded within a FRAME. There is only one PACKET in a FRAME.

In addition to the three levels of X.25 communication, there are divisions within level-2 and level-3. At level-2, there are nine types of FRAMEs which fall into one of three main categories: information FRAMEs (also known as I-FRAMEs), supervisory FRAMEs and unnumbered FRAMEs. Only I-FRAMEs contain level-3 PACKETs while the other two kinds of FRAMEs essentially contain network control information. Likewise, at level-3 there are seventeen types of PACKETs which may also be grouped according to network function.

The PACKET is the virtual level item of communication between DTEs. The X.25 defines a PACKET as a block of bytes having two parts, an n-byte header field followed by a data-field (although not every packet will necessarily have a data field). The data-field contains information comprising the DTE user's message. The data-field typically has a maximum length of 128 bytes. A single message usually consists of numerous PACKETs because of limitations on the data-field's length. The n-byte header field has at least three parts: a 4-bit general-format-indentifier field (GFI), followed by a 12-bit logical-channel-identifier field (LCI), followed by an 8-bit packet-type-indentifier field (PTI). The GFI, LCI and PTI contain important network information. The GFI contains, among other things, the type of acknowledgement required by the PACKET's sender. The LCI identifies the PACKET's virtual circuit at a given DTE-DCE interface. The 12-bit LCI consists of a 4-bit logical channel group number (LCGN) and an 8-bit logical channel number (LCN), which have further network signfificance. The PTI contains the PACKET's send and receive sequence numbers and identifies the PACKET's type. (The PACKET header may also include a DTE addressing field, depending upon the type of PACKET, and a facility field encoding the network facilities which the DTE user chose when subscribing to the X.25 network. The DTE addressing field encloses the network address of the "calling" and "called" DTEs. This field is present only in a so-called call-request PACKET which the X.25 network uses to initially set up a virtual circuit.) The X.25 WAN packet-switched network is explained in detail in the following references: *X.25: The PSN Connection, An Explanation of Recommendation X.25*, Hewlett-Packard, part no. 5958–3402, 1984; and, *X.25 Wide Area Networking for HP Computers,* Hewlett-Packard Journal, Vol. 37, no. 10, p. 36, October 1986.

Since the LCI field of a Packet is 12-bits long it can identify $2^{12} = 4096$ separate channels, that is, DTE-to-DTE virtual circuits at a single DTE-DCE interface. (In X.25 systems, however, the first channel is always reserved for network control purposes so that at most 4095 channels are available at any one DTE-DCE interface.) Although the maximum number of simultaneously active channels at one DTE-DCE interface is normally less than one hundred, it is theoretically possible for all the channels to be active. In addition, channels may be grouped by type of service. Typically, a DTE user and the network will enter a local agreement at subscription time regarding assignment of LCI channels to type of service. Four types of service are available at a given DTE-DCE interface: one-way outgoing calls only, one-way incoming calls only, two-way and permanent virtual circuit. A call is essentially a virtual connection between two DTEs such that information data may be exchanged, conceptually analogous to a telephone call between two individuals. The potentially large number of active channels compounded by the different types of service creates a significant communications management problem for a DTE user at a busy DTE-DCE interface. Currently, we know of no prior art device which allows the DTE user to quickly determine the status of all 4095 possible channels at a given DTE-DCE interface.

SUMMARY OF THE INVENTION

The present invention is a channel status display for an X.25 packet-switched WAN DTE-DCE interface. The invention is used in a protocol analyzer which taps into the DTE-DCE link to monitor and analyze, without interrupting, the communication between a DTE and its DCE. The invention allows the protocol analyzer user to quickly view the status of each of the 4095 channels. In the preferred embodiment of the present invention, a channel may assume one of four states: idle, call-being-placed, data-being-transferred, and call-being-cleared. A status key assigns a unique display screen marker to each channel status. Status markers are displayed in 13-by-20 matrix format, 256 markers at a time. Each marker position in the matrix corresponds to a single channel. Hencwe, the protocol analyzer user may page through all 4095 channels, viewing the status markers for 256 channels at a time. In the preferred embodiment, the status key is displayed to the right of the matrix. The 13 rows of the matrix are numbered 0, 20, 40, 60, . . . , 220, 240 down the lefthand side of the matrix as a viewer aid.

A display screen cursor may be moved throughout the matrix. Once the cursor is placed on a marker, a call record display corresponding to that marker position may be summoned. The call record is a complete listing of channel information. The call record includes, among other things, the "calling" and "called" DTE addresses for the channel; the date and time the virtual circuit comprising the channel was initiated; the number of packets transmitted over the channel; and so forth.

Hence, the present invention allows the protocol analyzer user to quickly scan the status of 4095 X.25 channels at a given DTE-DCE interface, 256 channels at a time, and to call up additional information on any one channel via cursor placement.

The present invention is novel because no other device shows the status, graphically or otherwise, of all 4095 channels at an X.25 DTE-DCE interface. Prior art devices allow the user to look through a limited list of call information for active channels but give no information about idle channels. Moreover, mere absence from such a list does not ensure that a channel is idle since the list is often limited to 16 or 32 channels. The present invention, on the other hand, can display the status of all 4095 channels, 256 channels at a time, directly indicating both idle and active channels, as well as the type of activity occurring in the active channel. Moreover, call record information on any channel, idle or active, is immediately available to the user via cursor movement.

The present invention also provides significant network management capability as a result of indexing and displaying call information by LCI number. It is X.25 network practice to assign the higher number LCIs to calls originating at DTEs and lower number LCIs to calls originating at DCEs. Hence, at a given DTE-DCE interface, the higher LCIs will signify outgoing calls and the lower LCIs will signify incoming calls. The user of the present invention can use this information to quickly compare outgoing-versus-incoming calls at a given DTE-DCE interface by examining the channel status of higher-versus-lower LCI ranges. In addition, the network also typically assigns certain ranges of LCI numbers for each type of service, that is, one-way-outgoing, one-way-incoming, two-way, and permanent-virtual-circuit. The present invention, therefore, automatically groups the calls by type of service category, such that a network subscriber can quickly view the status of an entire category of calls simply by paging to the proper LCI numbers. We believe that these management features are unavailable in the prior art because we know of no other device which shows all 4095 channels indexed by LCI.

BRIEF DESCRIPTION OF THE DRAWINGS

FIG. 5-B shows a sample Call Record Display.

FIG. 8 shows a schematic diagram of representative call-record$_i$ of FIG. 7.

DESCRIPTION OF THE PREFERRED EMBODIMENT

Figure 1:
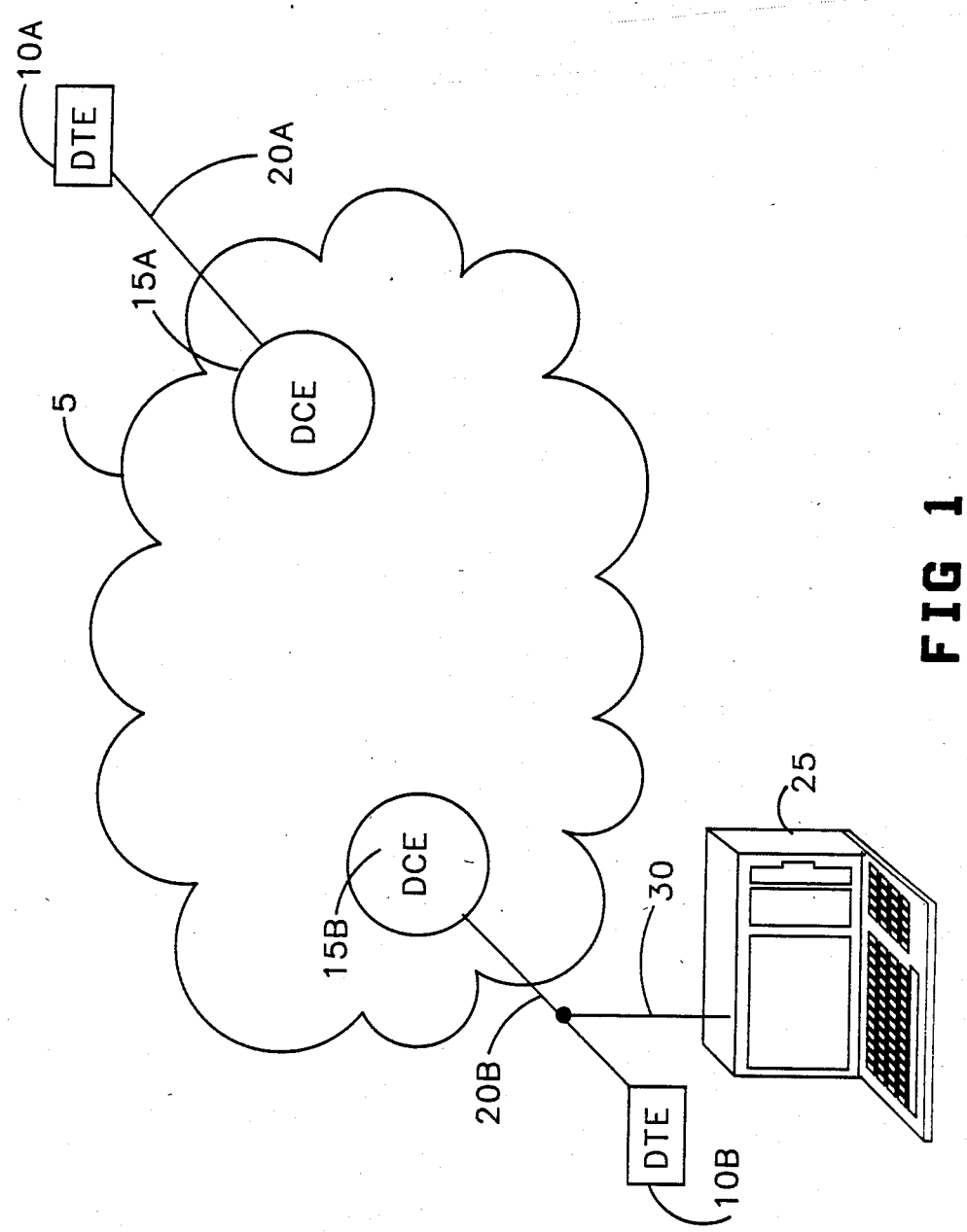
FIG. 1 shows a schematic diagram of an X.25 WAN.

FIG. 1 shows a schematic diagram of an X.25 WAN. DTE 10A can establish a virtual circuit through WAN cloud 5 with DTE 10B. DCE 15A is DTE 10A's port into WAN cloud 5. DCE 15B is DTE 10B's port into cloud 5. X.25 link 20A connects DTE 10A and DCE 15A. X.25 link 20B connects DTE 10B and DCE 15B. DTE 10A(B) communicates with DCE 15A(B) through the exchange of X.25 level-2 FRAMEs over link 20A(B). Protocol analyzer 25, such as would be used with the prresent invention, taps into X.25 link 20B via line 30. Protocol analyzer 25 reads, monitors and analyzes (without interrupting) FRAME traffic on link 20B.

Figure 2:
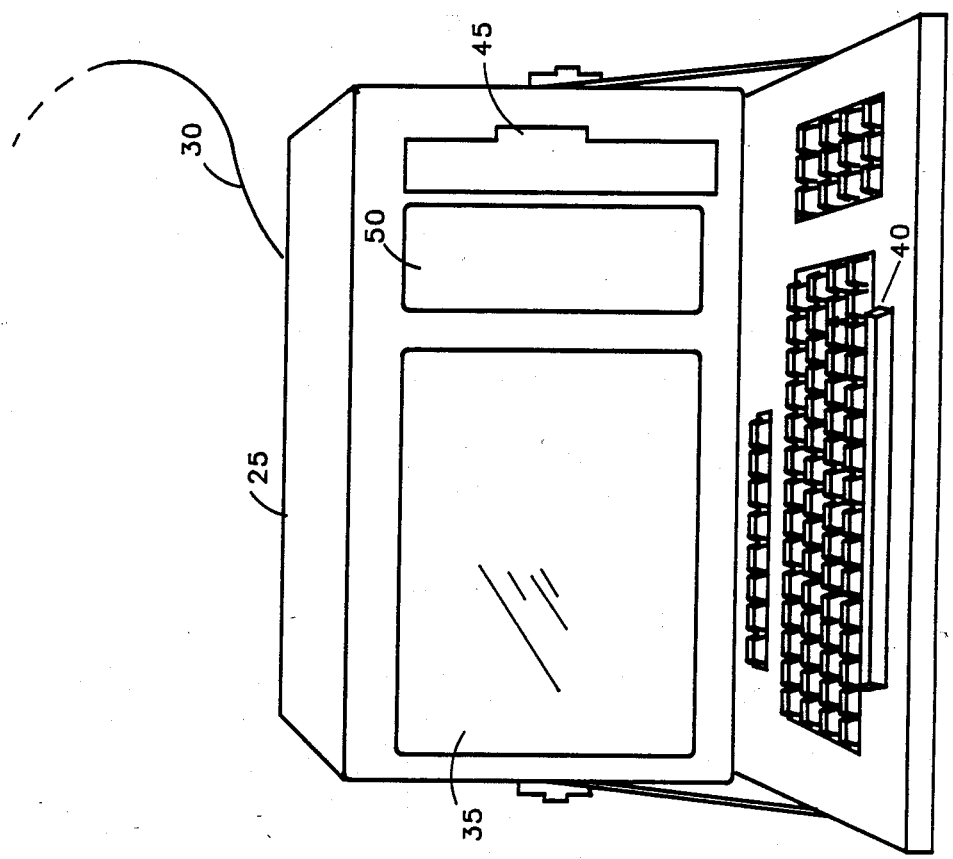
FIG. 2 shows a front view of protocol analyzer 25 such as would be used with the present invention.

FIG. 2 shows a front view of protocol analyzer 25 such as would be used with the present invention. Protocol analyzer 25 has a display screen 35, keyboard 40, tape-drive 45, light-indicator panel 50 and line 30 which connects into a port on the backside of protocol analyzer 25.

Figure 3:
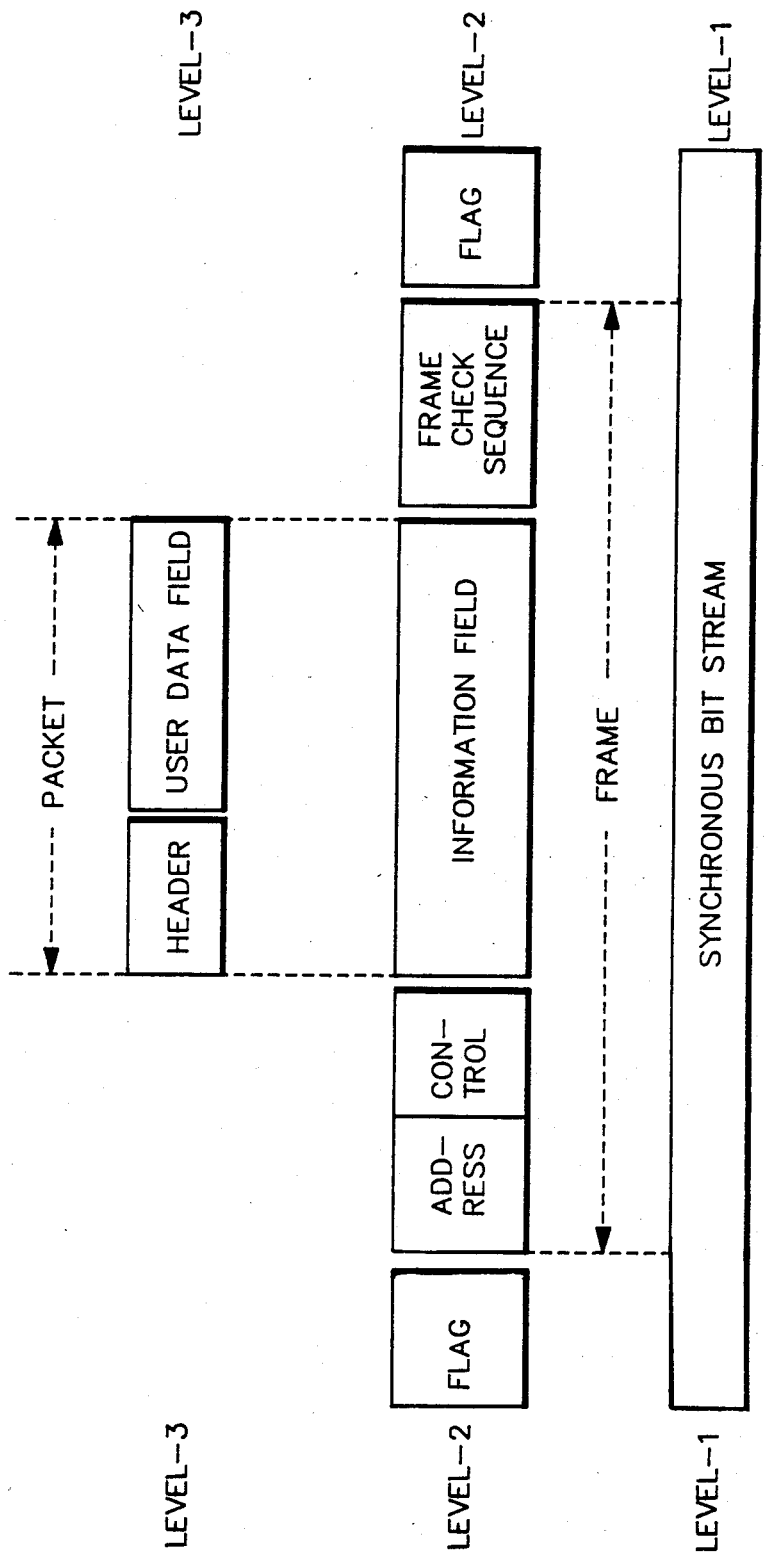
FIG. 3 shows a comparative schematic diagram of X.25 level-1, level-2 and level-3 protocols.

FIG. 3 shows a comparative schematic diagram of X.25 level-1, level-2 and level-3 protocols. As can be seen from FIG. 3, X.25 at level-1 is essentially a synchronous bit stream. At its most fundamental level, information on an X.25 network travels in a synchronous bit stream. At level-2, the X.25 protocol consists of discrete FRAMEs. Logically at level-2, information on an X.25 network travels in FRAMEs. Each level-2 FRAME is headed by an 8-bit flag, followed by an 8-bit address-field, followed by an 8-bit control-field, possibly followed by a variable length information-field, followed by a 16-bit frame-check-sequence-field, followed by an ending 8-bit tail flag. The X.25 level-2 protocol defines nine types of FRAMEs. FRAME-type in encoded in the 8-bit control-field. FRAMEs having information fields, known as I-FRAMEs, comprise one of the nine types. I-FRAMEs are particularly important to the present invention. I-FRAMEs contain level-3 information which is used by the present invention. At level-3, the X.25 protocol consists of discrete PACKETs comprising the information-fields of level-2 I-FRAMEs. Logically at level-3, information on an X.25 network travels in PACKETs. Each PACKET consists of a n-byte header-field followed by a variable length user-data-field. In some cases, a PACKET may have no user-data, in which cases the PACKET is known as a control-PACKET. Control PACKETs serve to set up and maintain a DTE-to-DTE virtual circuit at the DTE-DCE interface. PACKETs containing user-data are known as user-data-PACKETs.

Figure 4:
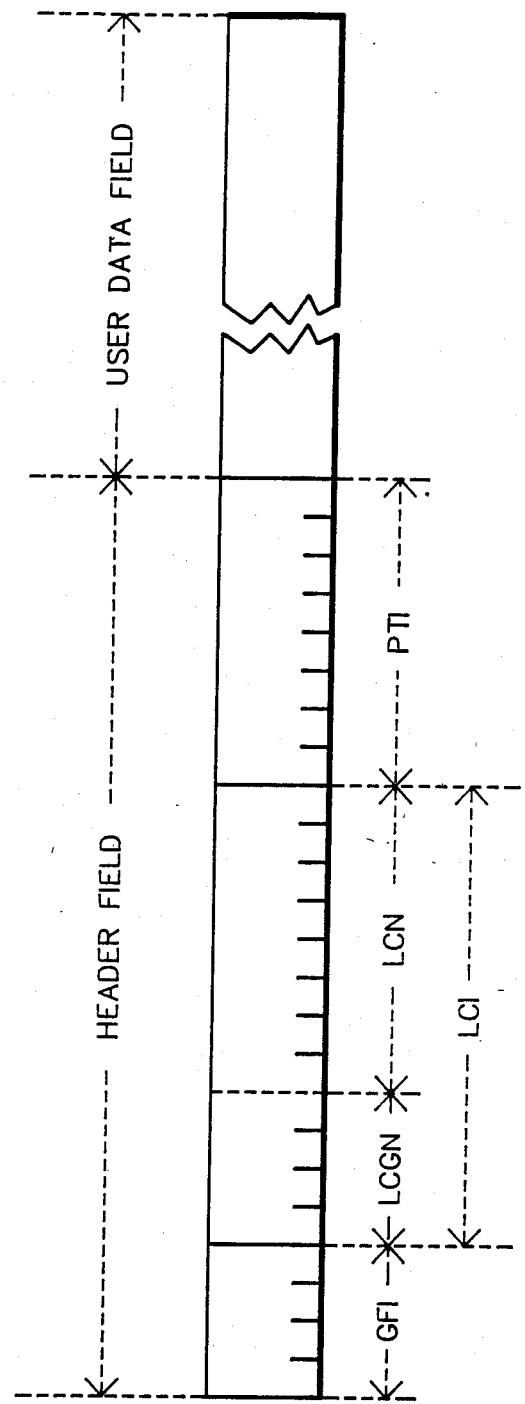
FIG. 4 shows a schematic diagram of the X.25 level-3 protocol for a user-data-PACKET.

FIG. 4 shows a schematic diagram of the X.25 level-3 protocol specification for a user-data-PACKET. The n-byte header-field has at least three parts: a 4-bit GFI, a 12-bit LCI, and an 8-bit PTI. The 12-bit LCI has two parts: a 4-bit LCGN and an 8-bit LCN. The 12-bit LCI field is particularly important to the present invention. The 12-bit LCI identifies one of 4095 possible logical channels, that is, virtual circuits, over which the PACKET is being transmitted or received, as the case may be, at a givwen DTE-DCE interface. (Although there are $2^{12}=4096$ possible combinations, the first channel is always reserved for control purposes in X.25 systems so that there are 4095 channels available for virtual circuits.) Given that the most significant four bits comprise the 4-bit LCGN and the remaining eight bits comprise the 8-bit LCN, there are $2^4=16$ logical channels groups with $2^8=256$ channels per group, except for the first group, LCG #0, which has 255 channels.

Figure 5B:
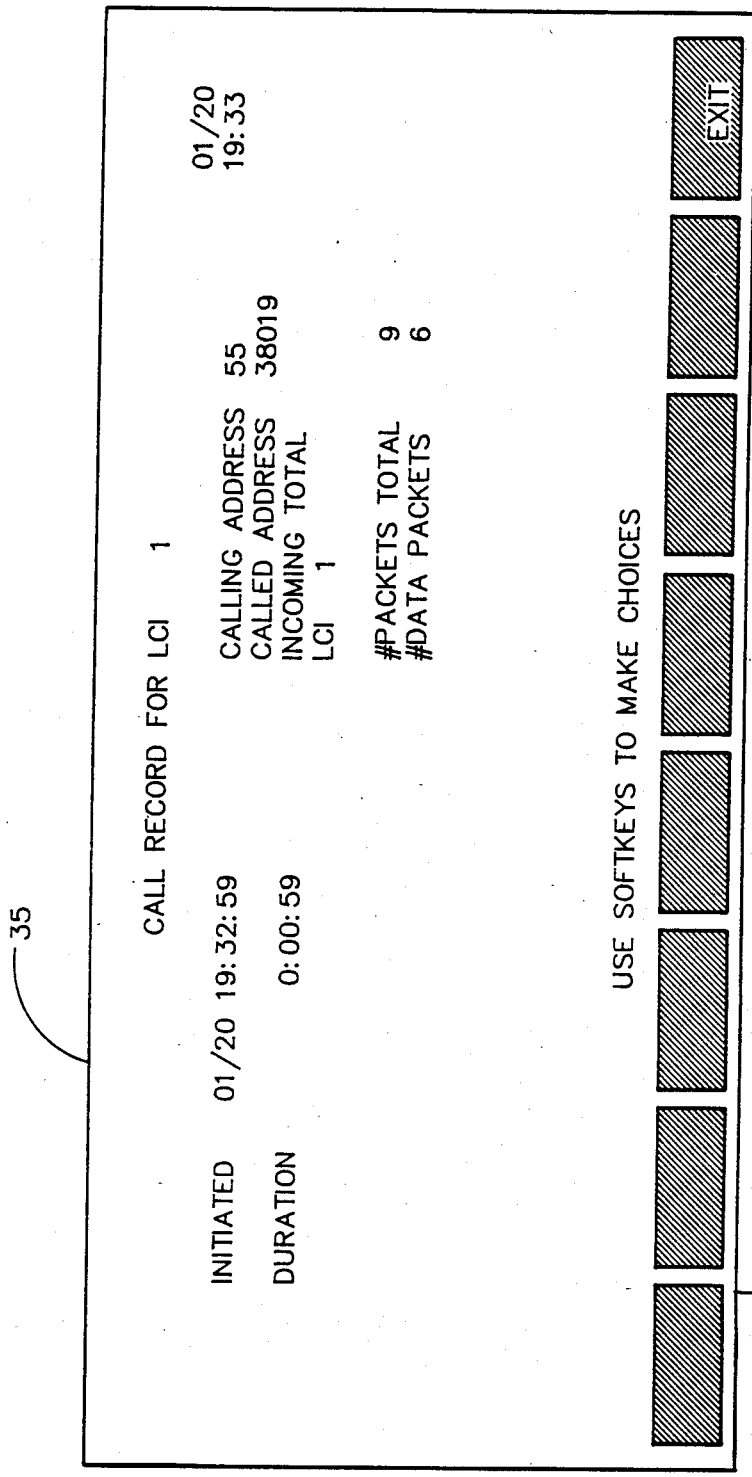
FIG. 5-A shows a sample Channel Activity Display.

FIG. 5-A shows a sample Channel Activity Display. A Channel Activity Display shows the status of one LCGN, that is, a logical group of 256 channels at once for a given DTE-DCE interface. In the center of the display is a 13-X-20 matrix having 256 elements. Each element in the matrix corresponds to a single channel. (Incidentally, LCGN O, shown in FIG. 5-A, has only 255 channels since the first channel, LCI O, is reserved for network control purposes.) The current status of a given channel is indicated by the status-character occupying that channel's corresponding element in the matrix. In the preferred embodiment of the present invention, a channel may assume one of four states: idle, call-being-placed, data-being-transferred and call-being-cleared. A status key to the right of the matrix assigns a unique status-character to each of the four states. Depending upon a channel's state, the appropriate status-character is displayed in that channel's corresponding matrix element. Below the status key is a highlighted boolean indicator which informs the viewer whether the X.25 DCE-DTE link is up or down. Below the link status boolean is a highlighted cursor-position-indicator. A highlighted cursor can be moved throughout the matrix by the viewer. The cursor-position indicator displays an Arabic number corresponding to the cursor's current position in the matrix. To the left of the matrix, the thirteen rows of the matrix are numbered 0, 20, 40, 60, . . . , 220, 240 as a viewer aid, where each row-number corresponds to the position in the 256-element matrix of the left-most element in each row. Further to the left of the top of the matrix is an LCGN indicator which gives the current LCGN. The viewer can page up or down through all 4095 channels one LCGN at a time or roll up or down through the channels one 20-element row at time using keyboard 40 function keys. Above the top left-hand corner of the matrix is displayed the starting time and duration of the current matrix. Note that the starting time includes the date. Above the center of the matrix is displayed the current range of LCI numbers for the current matrix. To the right of the LCI range is displayed the current date and time. Along the bottom of the matrix are highlighted replicas of keyboard 40 functions available to the viewer. The View-Call-Record function displays the call record for the channel currently highlighted by the cursor. The Print-Screen function prints a hard copy version of the current display screen. The Exit function exits the Channel Activity Display.

FIG. 5-B shows a sample Call Record Display. The viewer may opt for the Call Record Display corresponding to the current cursor position in a given Channel Activity Display. The Call Record Display is summoned by choosing the View-Call-Record function in the Channel Activity Display. As shown in FIG. 5-B, the Call Record Display presents the following information: a title indicating that the display is the call record for the chosen channel, that is, the viewer-selected LCI number; the date and time that the call was initiated and the duration of the call; the current date and time; the network address of the calling DTE; the network address of the called DTE; whether it is an incoming or an outgoing call; identification of the channel number over which the call is transmitted at the given DTE-DCE interface; the number of level-3 packets in the call; and highlighted replicas of the keyboard 40 function keys.

Figure 6:
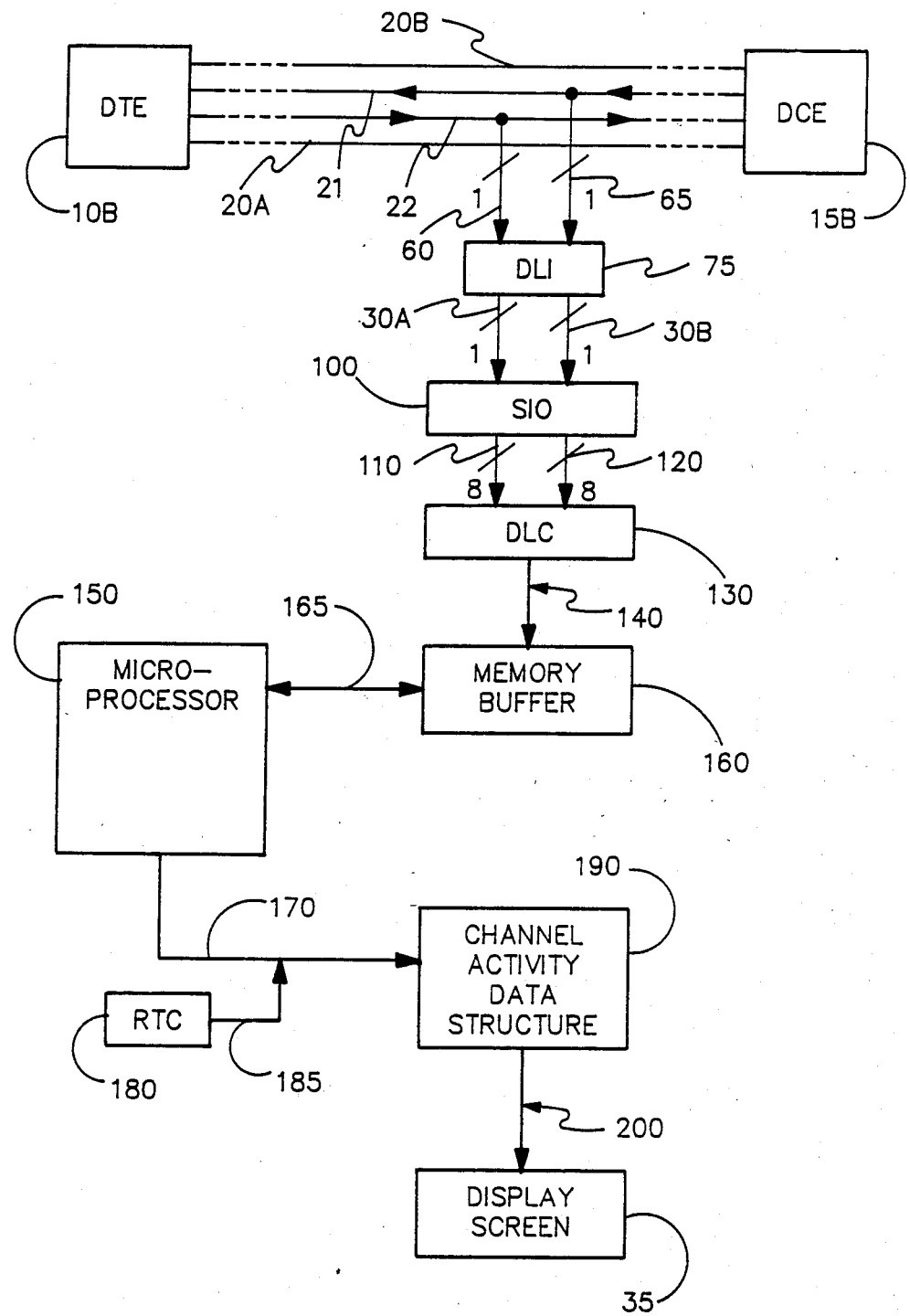
FIG. 6 shows a schematic diagram of the present invention.

FIG. 6 shows a schematic diagram of the present invention. X.25 link 20B connects DTE 10B and DCE 15B. DTE 10B and DCE 15B communicate through the exchange of level-2 FRAMEs. Such FRAMEs are embedded in serial level-1 synchronous bit streams. DCE-to-DTE FRAMEs are transmitted over serial line 21. DTE-to-DCE FRAMEs are transmitted over serial line 22. SIO (Serial Input/Output) 100 interfaces X.25 link 20B with DLI (Data Link Interface) 75. DLI 75 is a an interface pod which converts the X.25 level-1 electrical signals to TTL signals suitable for input to SIO 100. DLI 75 reads DTE-to-DCE bit-streams, without disturbing their transmission, from line 22 via line 60 and transfers them to SIO 100 via line 30A. Likewise DLI 75 reads DCE-to-DTE bit-streams, without disturbing their transmission, from line 21 via line 65 and transfers them to SIO 100 via line 30B. In the preferred embodiment of the present invention, SIO 100 is implemented with a Zilog Company Z8441B serial-input-output-controller chip. SIO 100 converts serial DTE-to-DCE bit streams to DTE-to-DCE byte-wide streams and transfers them to DLC (Data Link Controller) 130 via line 110. Likewise, SIO 100 converts serial DCE-to-DTE bit-streams to byte-wide DCE-to-DTE streams and transfers them to DLC 130 via line 120. DLC 130 processes the byte-wide DTE-to-DCE and DCE-to-DTE streams and generates a discrete data-package, known in the terminology of the present invention as a FRAME-unit, for each FRAME contained in the byte streams received from SIO 100. A FRAME-unit is a discrete encoded sequence of bytes which completely identifies and characterizes a FRAME with the following parameters: an encoded frame-type field determined from the control-field of the FRAME; the GFI and the LCI of an I-FRAME; an encoded packet-type field determined from the PTI bits of an I-FRAME; a DXE-field which indicates whether it is a DTE-to-DCE or a DCE-to-DTE FRAME; and possibly a DTE address field, giving the network addresses of the "calling" and "called" DTEs if the FRAME contains a call-request PACKET, as discussed in the BACKGROUND. In the preferred embodiment of the present invention, DLC 130 is implemented with a Zilog Company Z8400B microprocessor. FRAME-units are sequentially stored by DLC 130 in memory-buffer 160 via line 140. Microprocessor 150 then processes each new FRAME-unit in memory-buffer 160 via line 165. Microprocessor 150 continually scans memory-buffer 160 looking for new FRAME-units. Microprocessor 150 uses the information in each new FRAME-unit (together with real-time information from RTC (Real Time Clock) 180 delivered via line 185) to update channel-activity-data-structure 190 via line 170. Channel-activity-data-structure 190 is a dynamic data-structure accessed by LCI number. The information in channel-activity-data-structure 190 is continually mapped onto display screen 35 via line 200 to produce Channel-Activity-Displays and Call-Record-Displays such as shown in FIGS. 5-A and 5-B.

Figure 7:
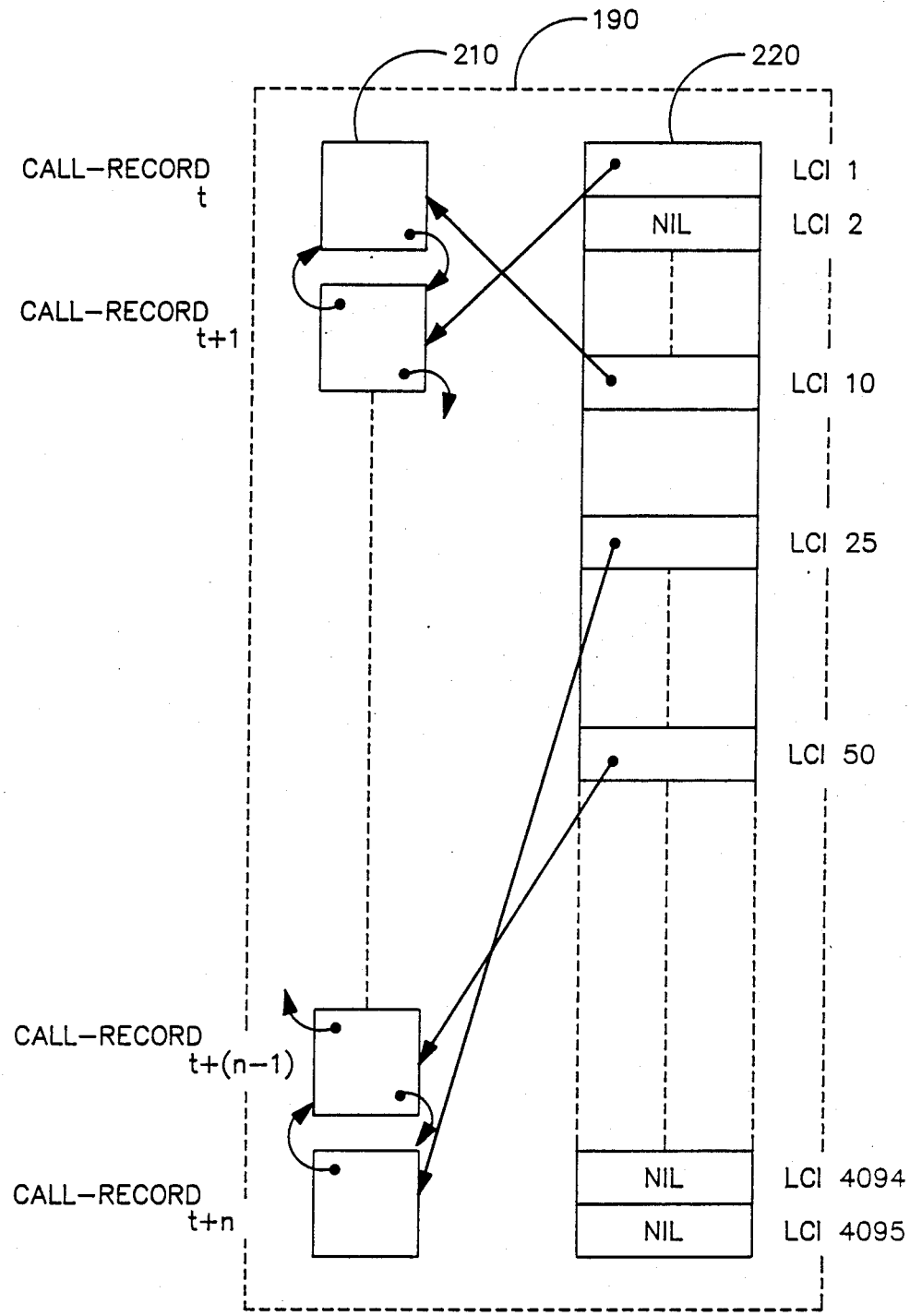
FIG. 7 shows a schematic diagram of channel-activity-data-structure 190 of FIG. 6.

FIG. 7 shows a schematic diagram of channel-activity-data-structure 190 of FIG. 6. Channel-activity-data-structure 190 consists of linked-list 210 and pointer-array 220. Linked-list 210 is a dynamic doubly linked-list of call-records. Pointer-array 220 is a 4095-element array of pointers indexed by LCI number. Each element of pointer-array 220 either points to an active call-record corresponding to its index or points to NIL if the channel corresponding to its index is idle. For instance, as shown in FIG. 7, channels #1, #10, #25 and #50 are active so the first, tenth, twenty-fifth and fiftieth elements of pointer-array 220 each point to a call-record in linked-list 210. On the other hand, channels #2, #4094 and #4095 are idle so the corresponding elements in pointer-array 220 point to NIL. Linked-list 210 is formed such that the most recent call-record is appended to the bottom of the list. Thus, in lined-list 210, the call-record for LCI 25, that is, call-record$_{t+n}$, is the most recent call-record in linked-list 210 while the call-record for LCI 10, that is, call-record$_t$, is the oldest. In the preferred embodiment of the present invention, the maximum length of linked-list 210 is purposely limited to 256 call-records since it is practically unlikely that a greater number of channels will be simultaneously active at a single DTE-DCE interface. On the other hand, when a channel makes a transition from active to idle its call-record will be deleted from the list.

FIG. 8 shows the fields of a call-record, such as call-record$_{t+1}$ of FIG. 7. Information in a call-record is determined from FRAME-units as discussed in connection with FIG. 6. The first field is the state-of-channel field which gives the state of the channel for which the record is being maintained. The four possible states are idle, call-being-placed, data-transfer, and call-being-cleared. The next field is the channel number field which holds the LCI number of the channel over which the call is occurring. The next field is a count of the number of control-PACKETs transmitted in the call. The next field is a count of the number of user-data-PACKETs transmitted in the all. The next field contains the network address of the calling DTE. The next field contains the network address of the called DTE. The next field contains the time the call was initiated (determined from RTC 180 input, as shown in FIG. 6). The next field shows who initiated the call, the DTE or the DCE, that is, whether the call is outgoing or incoming, respectively. The next field shows whether the call was successful (an unsuccessful call is a call that was cleared rather than accepted by the called DTE). The next field indicates what type of PACKET ended the call. The next field indicates who ended the call, that is, the DTE or the DCE. The next field is a pointer to the previous call-record in the linked list of call-records, or a pointer to NIL if there is no previous call-record. The next field is a pointer to the next call-record in the linked-list of call-records, or a pointer to NIL if there is no next call-record. As shown in FIG. 8, a call-record contains all the information necessary to produce a Call-Record-Display such as the one in FIG. 5-B.

Figure 9:
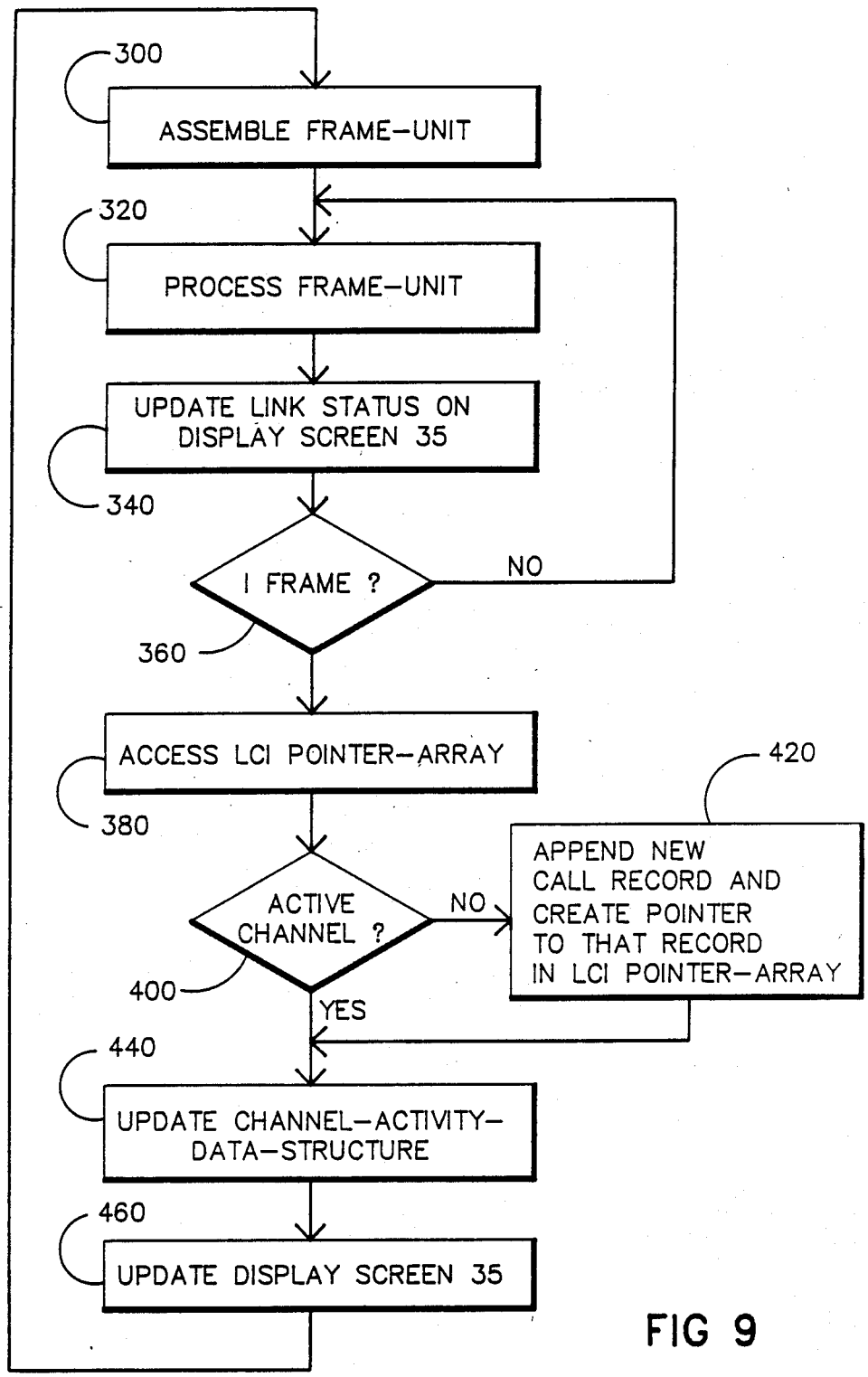
FIG. 9 is a macro-level flow-chart showing the sequence of steps that occur to produce the present invention.

FIG. 9 is a macro-level flowchart showing the sequence of steps that occur to produce the present invention. In step 300, the invention first assembles a FRAME-unit and stores it in a memory-buffer using the DLI 75, SIO 100, DLC 130 and memory-buffer 160 as described in connection with FIG. 6. In step 320, microprocessor 150 then reads and processes a FRAME-unit from in memory-buffer 160. In step 340 the X.25 link status is updated. The link status is determined from the sequence of FRAME-units as they are read out of memory-buffer 160 by microprocessor 150 in step 320. The link may be up or down. In step 360 the FRAME-unit is tested to determine if it represents an I-FRAME. If not, another FRAME-unit is read and processed as in step 320. Otherwise, step 380 occurs where the LCI bits of the FRAME-unit are used to access the "LCI$^{th}$∞ pointer in pointer-array 220 of FIG. 7. Based on the "LCI$^{th}$" pointer accessed in step 380, a decision is made in step 400. If the "LCI$^{th}$" pointer points to NIL then the channel corresponding to that LCI number is currently inactive, so a new call-record must be appended to linked-list 210 of FIG. 7 and a pointer to that call-record inserted in the "LCI$^{th}$" element of pointer-array 220, as shown in step 420. On the other hand, if it is determined in step 400 that the "LCI$^{th}$" pointer points to an active call-record in linked-list 210, then step 420 is by-passed. In any case, the next step 440 is to update channel-activity-data-structure 190, shown in FIG. 6 and the FIG. 7. The updating concerns the rewriting the fields of the appropriate call-records of linked-list 210, or deleting member call-records from linked-list 210, in accordance with any new information in the FRAME-unit. The final step 460 is to update display screen 35 to reflect any changes to data-structure 190. Steps 300 through 460 repeat continuously.

What is claimed is:

1. A dynamic communication channel status display system for monitoring channel activity on an X.25 wide area network DTE-DCE interface link, said display system showing the status of all possible logical channels at the interface link, said display system to be used with a protocol analyzer or a similar instrument, said display system comprising:
- a first display means for displaying a dynamic Channel Activity Display, said Channel Activity Display showing an n-by-m matrix arrangement of status characters wherein each status character is represetative of pre-determined logical channel status;
- said Channel Activity Display also having a status key indicating the meaning of each status character;
- cursor display means for displaying a cursor in said Display;
- cursor movement means for enabling a user of said display system to move said cursor to pre-determined positions within said Channel Activity Display;
- logical channel status identification means for identifying the status of at least one logical channel;
- association means for associating a pre-determined status character with a corresponding pre-determined logical channel status;
- logical channel group number (LCGN) numerical identification display means for numerically identifying and/or displaying an LCGN on said Channel Activity Display;
- logical channel identifier (LCI) numerical identification display means for numerically identifying and/or displaying an LCI number on said Channel Activity Display;
- said Channel Activity Display being user-configurable such that said n-by-m matrix shows the status of each logical channel in at least one LCGN of logical channels;
- said Channel Activity Display being further user-configurable to display an LCI number corresponding to the position of said cursor within said Channel Activity Display; and
- a second display means for displaying a dynamic Call Record Display, available as a display option to the viewer of said Channel Activity Display, said display system further comprising:
- organized-listing-call-information means for collecting, organizing and displaying an organized listing of call-information concerning a call on the logical channel corresponding to the position of the cursor in said Channel Activity Display, wherein said call-information includes an indication of at least one of the following:
- said logical channel's LCI number;
- a point in time at which said call on said logical channel was initiated;
- duration in time of said call;
- X.25 network addresses of the calling DTE and the called DTE of said call;
- number of X.25 level-3 packets exchanged in said call.

2. A dynamic communication channel status display system for monitoring channel activity on an X.25 wide area network DTE-DCE interface link, said display system showing the status of all possible logical channels at the interface link, said display system to be used with a protocol analyzer or a similar instrument, said display system comprising:
- a first display means for displaying a dynamic Channel Activity Display, said Channel Activity Display showing an n-by-m matrix arrangement of status characters wherein each status character is represented of pre-determined logical channel status;
- said Channel Activity Display also having a status key indicating the meaning of each status character;
- cursor display means for displaying a cursor in said Display;
- cursor movement means for enabling a user of said display system to move said cursor to pre-determined positions within said Channel Activity Display;
- logical channel status identification means for identifying the status of at least one logical channel;
- association means for associating a pre-determined status character with a corresponding pre-determined logical channel status;
- logical channel group number (LCGN) numerical identification display means for numerically identifying and/or displaying an LCGN on said Channel Activity Display;
- logical channel identifier (LCI) numerical identification display means for numerically identifying and/or displaying an LCI number on said Channel Activity Display;
- said Channel Activity Display being user-configurable such that said n-by-m matrix shows the status of each logical channel in at least one LCGN of logical channels;
- said Channel Activity Display being further user-configurable to display an LCI number corresponding to the position of said cursor within said Channel Activity Display.

3. The display system of claim 2 further comprising a second display means for displaying a dynamic Call Record Display, available as a display option to the viewer of said Channel Activity Display, said second display means comprising:
- organized-listing-call-information means for collecting, organizing and displaying an organized listing of call-information concerning a call on the logical channel corresponding to the position of the cursor in said Channel Activity Display.

4. The display system of claim 3 wherein said call-information includes an indication of at least one of the following:
- said logical channel's LCI number;
- a point in time at which said call on said logical channel was initiated;
- duration in time of said call;
- X.25 network addresses of the calling DTE and the called DTE of said call;
- number of X.25 level-3 packets exchanged in said call.

* * * * *

UNITED STATES PATENT AND TRADEMARK OFFICE
CERTIFICATE OF CORRECTION

PATENT NO. : 4,887,260

DATED : December 12, 1989

INVENTOR(S) : Matthew J. Carden, Kim Lantz, Theresa L. Reh, Anne Trytten and Yves Lubino It is certified that error appears in the above-identified patent and that said Letters Patent is hereby corrected as shown below:

Column 2, line 43, "signficance" should read -- significance --;

Column 3, line 35, "Hencwe," should read -- Hence, --;

Column 4, line 59, "prresent" should read -- present --;

Column 5, line 40, "givwen" should read -- given --;

Column 10, line 9, "represented" should read -- representative --.

Signed and Sealed this

Twelfth Day of March, 1991

Attest:

HARRY F. MANBECK, JR.

*Attesting Officer*  *Commissioner of Patents and Trademarks*